(12) United States Patent
Normen et al.

(10) Patent No.: US 6,330,832 B1
(45) Date of Patent: Dec. 18, 2001

(54) CORIOLIS FLOWMETER HAVING A CASING ENCLOSED IN A VENEER

(75) Inventors: David F. Normen, Louisville; Michael Leon Overfeldt, Longmont, both of CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 09/345,085

(22) Filed: Jun. 30, 1999

(51) Int. Cl.[7] ..................................................... G01F 1/84
(52) U.S. Cl. .................. 73/861.357; 73/861.354
(58) Field of Search ....................... 73/861.354, 861.355, 73/861.356, 861.357, 273

(56) References Cited

U.S. PATENT DOCUMENTS 4,823,614  4/1989  Dahlin .
4,854,178 * 8/1989  Dollfus ............................. 73/861.58
5,347,874 * 9/1994  Kalotay et al. ................ 73/861.357
5,365,794 * 11/1994 Hussain et al. ................ 73/861.357
5,850,039  12/1998 Van Cleve et al. .
5,996,225 * 12/1999 Ollila et al. ....................... 29/888.09

FOREIGN PATENT DOCUMENTS

WO 92/14123  8/1992  (WO) .
WO 98/07008  2/1998  (WO) .

\* cited by examiner

*Primary Examiner*—Max Noori
(74) *Attorney, Agent, or Firm*—Chrisman, Bynum & Johnson P.C.

(57) ABSTRACT

An apparatus for enclosing a flow tube of a device for measuring properties of a material flowing through the flow tube having a casing and a veneer. The casing substantially encloses flow tube from inlet end to outlet end and withstands the structural load of the flow tube. The veneer encloses the casing and provides a sanitary surface for said casing.

25 Claims, 5 Drawing Sheets

CORIOLIS FLOWMETER HAVING A CASING ENCLOSED IN A VENEER

FIELD OF THE INVENTION

This invention relates to a casing enclosing a Coriolis flowmeter. More particularly, the present invention relates to a veneer on the outside of the casing that allows the casing to be used in sanitary applications. Still more particularly, the present invention relates to a veneer that encloses a casing and that provides a sanitary and/or corrosion proof surface for the casing.

PROBLEM

It is known to use Coriolis effect mass flowmeters to measure mass flow and other information of materials flowing through a pipeline as disclosed in U.S. Pat. No. 4,491,025 issued to J. E. Smith, et al. of Jan. 1, 1985 and Re. 31,450 to J. E. Smith of Feb. 11, 1982. These flowmeters have one or more flow tubes of a curved or a straight configuration. Each flow tube configuration in a Coriolis mass flowmeter has a set of natural vibration modes, which may be of a simple bending, torsional, radial, or coupled type. Each flow tube is driven to oscillate at resonance in one of these natural modes. The natural vibration modes of the vibrating, material filled systems are defined in part by the combined mass of the flow tubes and the material within the flow tubes. Material flows into the flowmeter from a connected pipeline on the inlet side of the flowmeter. The material is then directed through the flow tube or flow tubes and exits the flowmeter to a pipeline connected on the outlet side.

A driver applies a vibrational force to the flow tube. The force causes the flow tube to oscillate. When there is no material flowing through the flowmeter, all points along a flow tube oscillate with an identical phase. As a material begins to flow through the flow tube, Coriolis accelerations cause each point along the flow tube to have a different phase with respect to other points along the flow tube. The phase on the inlet side of the flow tube lags the driver, while the phase on the outlet side leads the driver. Sensors at two different points on the flow tube produce sinusoidal signals representative of the motion of the flow tube at the two points. A phase difference of the two signals received from the sensors is calculated in units of time. The phase difference between the two sensor signals is proportional to the mass flow rate of the material flowing through the flow tube or flow tubes.

The flow tubes are typically enclosed in a casing. The casing prevents damage to the flow tubes from outside forces. The casing may also be used to contain material when a flow tube ruptures and may also be used as a spacer to maintain the distance between flanges connecting the flow tube to a pipeline.

It is a problem that customers sometimes require the casing to be made out of sanitary or corrosion resistant material. The casing must be made out of sanitary material that is easy to clean when the flowmeter is used in a system, such as an ingredient delivery system in food processing. The casing must be made of a corrosion resistant material when the flowmeter is inserted into an environment that may contain a corrosive material such as an acid.

In a conventional dual loop Coriolis flowmeter, it is not a problem to make a casing of sanitary or corrosion resistant material. A spacer bears the structural load of the flowmeter to reduce external vibrations and maintains proper spacing between the inlet and the outlet. The loop configuration of the flow tubes allows the middle section of the flow tube to expand outward and inward to account for expansion and contraction. Thus, the casing must have enough space between the casing and the tube to allow expansion and contraction of the flow tube. For these reasons, the casing and spacer may be made from or coated with a sanitary material in order to provide a sanitary surface for the flowmeter.

However, it is a problem to make a casing out of sanitary or corrosion resistant material for a straight tube Coriolis flowmeter. In a straight tube flowmeter, the casing and spacer are combined and provide the same function of bearing the structural load of the flowmeter. As the flow tube heats up and expands, the length of the flow tube increases because the straight tube must expand radially and axially.

The casing will be subjected to the same net axial loading of the flow tube, although the axial loading of the casing will be opposite in sign to that of the flow tube. However, the stress on the flow tubes will be much greater than the casing due to its smaller cross section. Therefore, the axial expansion of the flow tube is a problem because the casing is affixed to the flow tube at the ends of the flow tube and if the casing does not expand at the same rate as the tube, the flow tube will be subjected to stresses that will damage the integrity of the flow tube.

One solution may be to make the casing and the flow tube out of the same sanitary and corrosion resistant material. However, the cost of a corrosion resistant material such as titanium is prohibitive. Therefore, there is a need to make a casing that can withstand the stress applied by the thermal expansion of dissimilar metals while being cost efficient to produce. This will allow less expensive straight flow tube Coriolis flowmeters to be produced.

SOLUTION

The above and other problems are solved and an advance in the art is made by the provision of a casing for a Coriolis flowmeter enclosed in a veneer of sanitary or corrosion resistant material. For purposes of this invention, a veneer is a layer of material that encloses or is layered onto a surface of a casing to cover the material of the surface. The veneer of this invention allows a casing to carry the structural load of a flowmeter while a function of providing a sanitary surface is accomplished by the veneer.

A first advantage of this invention is that the use of a veneer of sanitary or corrosion resistant material to enclose the casing reduces the amount of sanitary or corrosion resistant material needed to produce a Coriolis flowmeter which reduces the cost of production. The amount of sanitary material needed is reduced because the casing does not have to be made of sanitary or corrosion resistant material. A second advantage is that the casing material may have a coefficient of thermal expansion that is substantially equal to the flow tube. Therefore, expansion and contraction of the casing and flow tube occur at substantially the same rate which reduces structural stress caused by thermal expansion.

The casing of this invention is constructed in the following manner to provide the above advantages. A casing encloses a flow tube of a Coriolis flowmeter. The casing is affixed to the opposing ends of the flow tube. The outer surface of the casing is enclosed by a veneer. The veneer is affixed to case ends made of a material having substantially the same properties as the veneer material to allow affixing. Further expansion and contraction of the veneer may be independent of the expansion and contraction of the casing.

In order for the expansion and contraction of the veneer to be independent of the expansion and contraction of the casing, there may be a space defined by a gap between an inner surface of the veneer and an outer surface of the casing. The space allows the casing to expand and contract freely inside the veneer.

Alternatively or in conjunction with the gap, a veneer may have bellows around the perimeters of opposing ends of the veneer. Bellows are bends in the surface veneer which may bent as the material of the veneer expands and may be pulled straight as the veneer contracts.

The gap between the veneer and the outer surface of the casing may be filled with insulation. The insulation keeps the temperature of the flow tube more uniform. The gap could also house heating elements that provide a heating jacket for the flow tube. Another possibility is that steam or other fluid could flow through the gap to regulate the temperature of the flow tube. All of these alternatives could be used to reduce axial stress on the flow tube due temperature gradients through the flow tube.

DESCRIPTION OF THE DRAWINGS

The above and other features of this invention can be understood from the Detailed Description as well as the following drawings.

DETAILED DESCRIPTION

Figure 1:
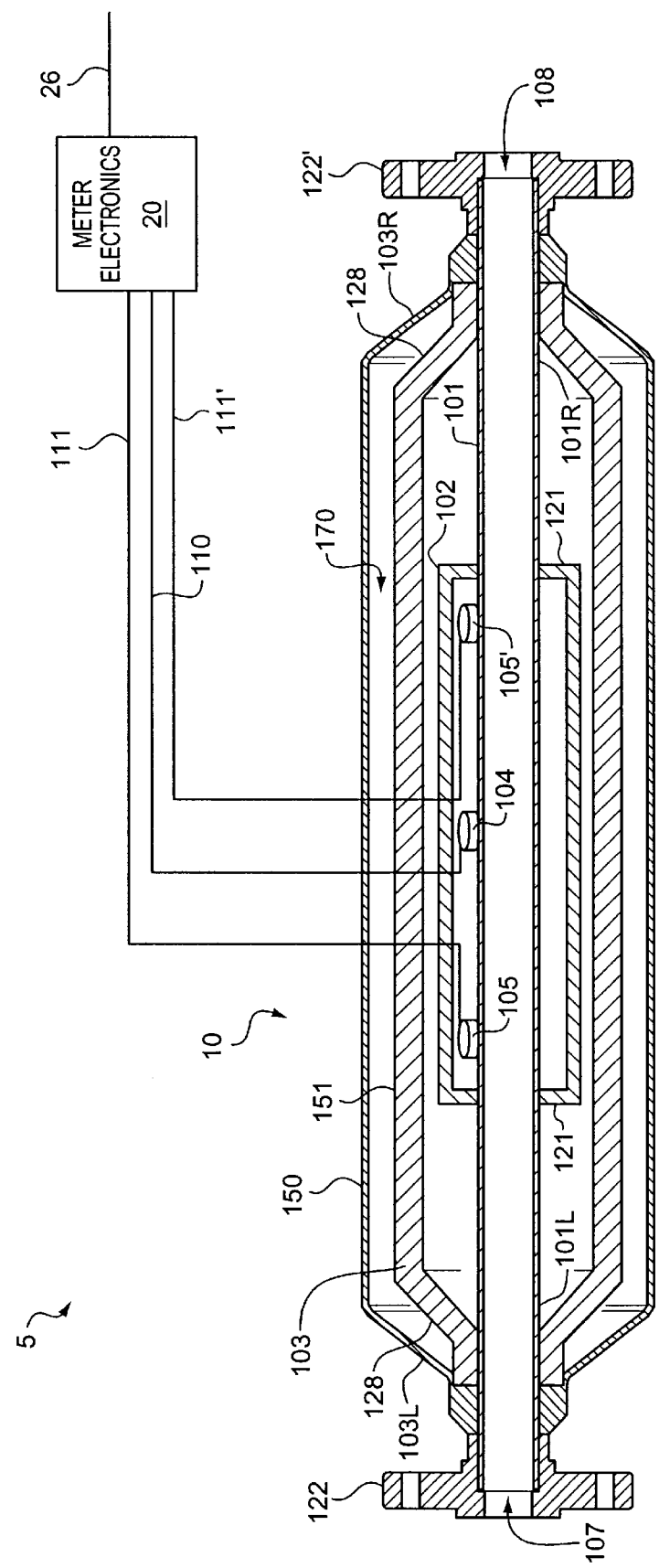
FIG. 1 illustrating a cross section of a veneer enclosing an outer surface of a casing that is enclosing a straight tube Coriolis flowmeter.

The present invention is described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure is thorough and complete, and conveys the scope of the invention to those skilled in the art. In the drawings, like numbers refer to like elements throughout.

FIG. 1 discloses a straight tube Coriolis flowmeter 5. Although shown in conjunction with a straight tube Coriolis flowmeter 5, those skilled in the art will recognize that this invention may also be used to house flow tubes having a curved or looped configuration. Coriolis flowmeter 5 is comprised of Coriolis sensor 10 and associated meter electronics 20.

Coriolis sensor 10 has casing 103 which encloses flow tube 101 and surrounding balance bar 102. The flow tube 101 includes a left end portion thereof designated 101L and a right end portion thereof designated 101R. Flow tube 101 and its ends portions extend the entire length of the flowmeter from the input end 107 of flow tube 101 to the output end 108 of the flow tube. The balance bar 102 is connected at its ends to flow tube 101 by brace bar 121.

Left end portion 101L of flow tube 101 is affixed to inlet flange 122 and right end portion 101R is affixed to outlet flange 122'. Casing 103 has end portions 128 extending axially out from each end of the casing and connecting casing 103 to inlet flange 122 and outlet flange 122'. Inlet flange 122 and outlet flange 122' connect Coriolis sensor 10 to a pipeline.

In a well known conventional manner, a driver 104 and a left pick off 105 and a right pick off 105' are coupled to flow tube 101 and balance bar 102. Driver 104 receives signals over path 110 from meter electronics 20 to cause driver 104 to vibrate flow tube 101 and balance bar 102 in phase opposition at the resonant frequency of the material filled flow tube 101. The oscillation of vibrating flow tube 101 together with the material flow therein induces Coriolis deflections in the flow tube in a well known manner. These Coriolis deflections are detected by pick offs 105 and 105' with the outputs of these pick offs being transmitted over conductors 111 and 111' to meter electronics 20. In a well known manner, the phase difference between the output signals of these pick offs represents information pertaining to the material flow within flow tube 101. The pick offs signals are received over conductors 111 and 111' by meter electronics 20 which in a well known manner processes these signals to generate output information that is applied to conductor 26 representing the various parameters of the material flow. These parameters may include density, viscosity, mass flow rate and other information regarding material flow.

The present invention as described herein, can produce multiple drive signals for multiple drivers. Meter electronics 20 processes left and right velocity signals to compute mass flow rate. Path 26 provides an input and an output means that allows meter electronics 20 to interface with an operator. An explanation of the circuitry of meter electronics 20 is unneeded to understand the casing 103 and veneer 150 of the present invention and is omitted for brevity of this description.

The present invention relates to casing 103 having a veneer 150 that encloses outer surface 151 of casing 103. In the present invention, casing 103 bears the structural load of casing and a separate veneer 150 provides a sanitary or corrosion proof surface for casing 103. Casing 103 is made of a first material. In the preferred embodiment, the first material is not sanitary and is not corrosion resistant.

In the preferred embodiment, veneer 150 is made of a second material that is dissimilar from the first material. For purposes of this discussion, dissimilar means that the two material have different properties, such as different coefficients of thermal expansion. In a preferred embodiment, the second material is a corrosion resistant material, such as stainless steel. Veneer 150 encloses the outer surface 151 and provides a sanitary and/or corrosive covering for sensor 10.

Figure 2:
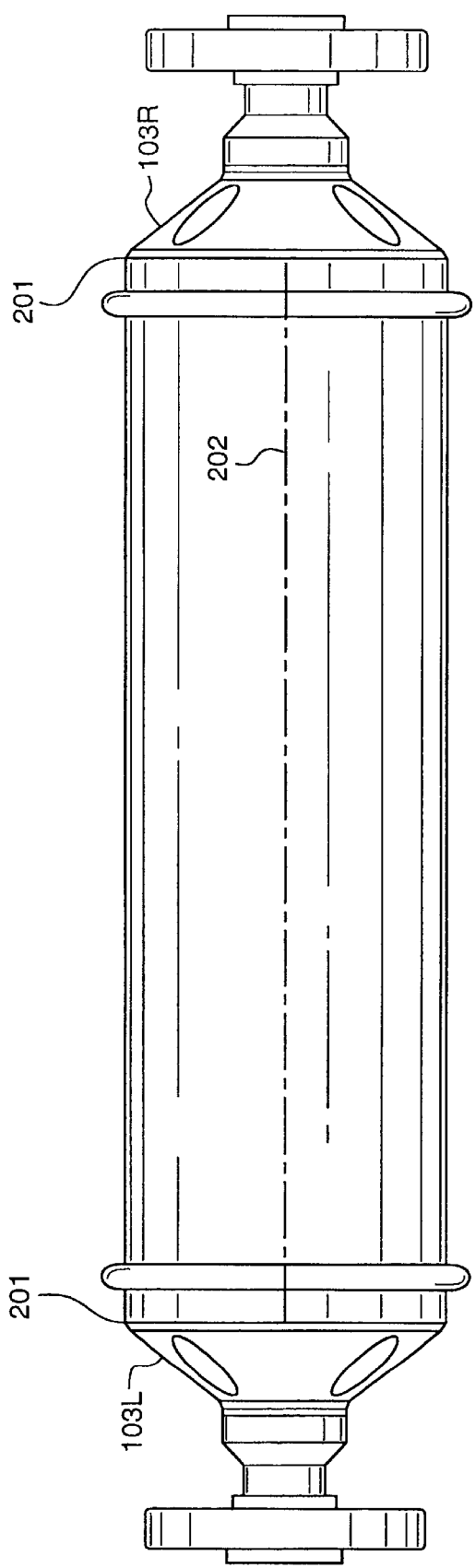
FIG. 2 illustrating a view of a casing having a veneer enclosing a flowmeter.

As seen in FIG. 2, veneer 150 is affixed to outer surface 151 of casing 103 (FIG. 1) in the following manner. Veneer 150 is affixed to ends 103L and 103R of casing 103 by orbital weld 201. Longitudinal weld 202 is used to seal overlapping sides veneer of 150 after veneer 150 is wrapped around casing 103. It is also possible to plate veneer 150 to outer surface 151, paint veneer 150 on outer surface 151, or to coat outer surface 151 with veneer 150 in some other manner.

In a preferred exemplary embodiment, casing 103 is made of a material that has a coefficient of thermal expansion that is substantially equal to the material from which flow tube 101 is made. For example, flow tube 101 may be made of titanium which has a coefficient of thermal expansion that is $4.6e^{-6}$ per degree Fahrenheit and casing 103 is composed of carbon steel which has a coefficient of $6.5e^{-6}$ per degree Fahrenheit which is sufficiently equal for most operations.

However, if the corrosion proof veneer 150 is made of a material such as stainless steel which has a coefficient of thermal expansion that is $6.5e^{-6}$ per degree Fahrenheit, the disparity between the thermal coefficients for veneer 150 and flow tube 101 or casing 103 can be too great. In order to prevent undo stress caused by the disparity in thermal coefficients, veneer 150 may be a separate structure having an inner surface and an outer surface. Veneer 150 may have ends that affix veneer 150 to a right end 103R of casing 103 and a left end 103L of casing 103.

Figure 4:
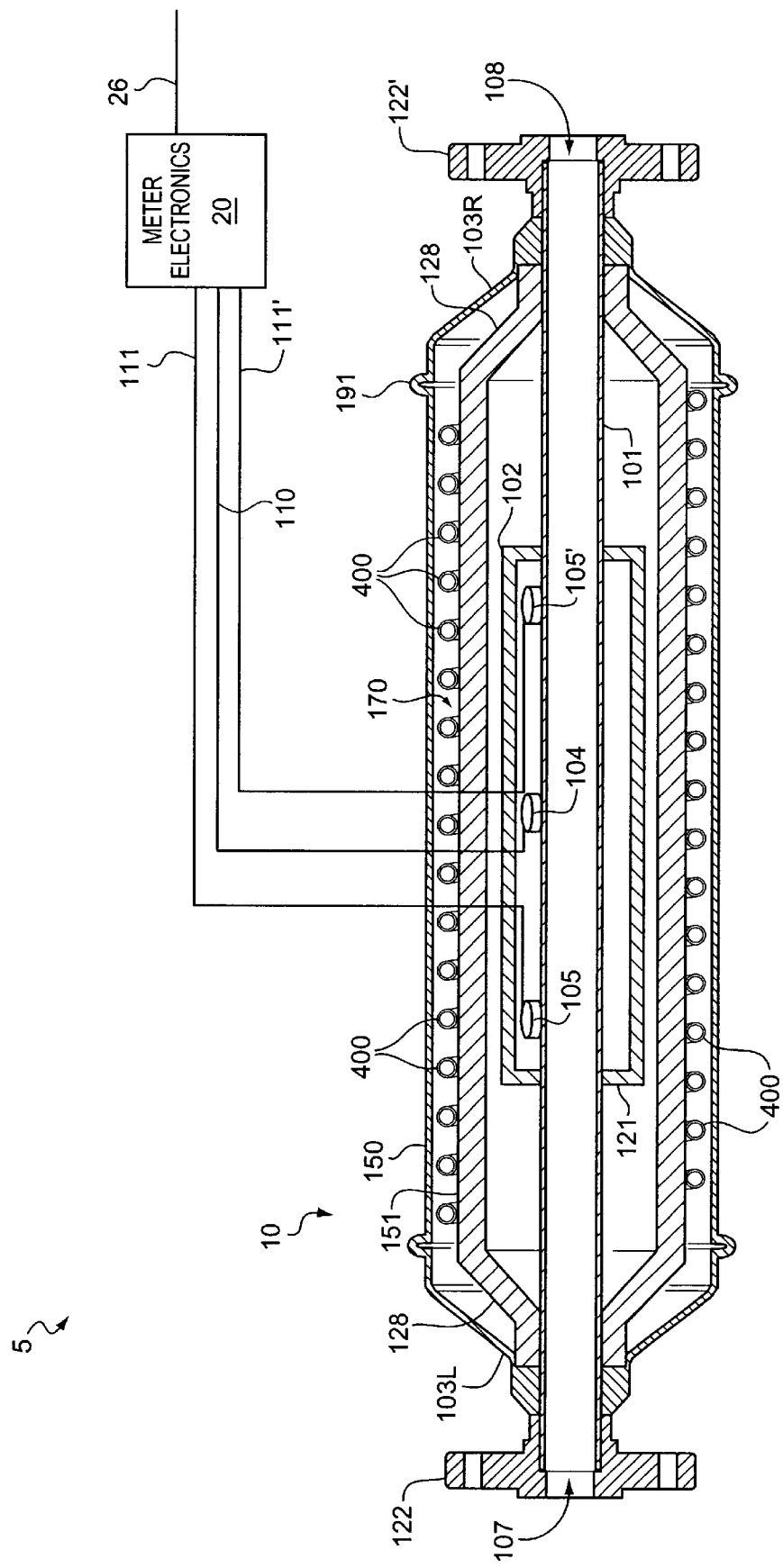
FIG. 4 illustrating a cross sectional view of the Coriolis Flowmeter showing heating elements in a gap between a casing and a veneer.
Figure 5:
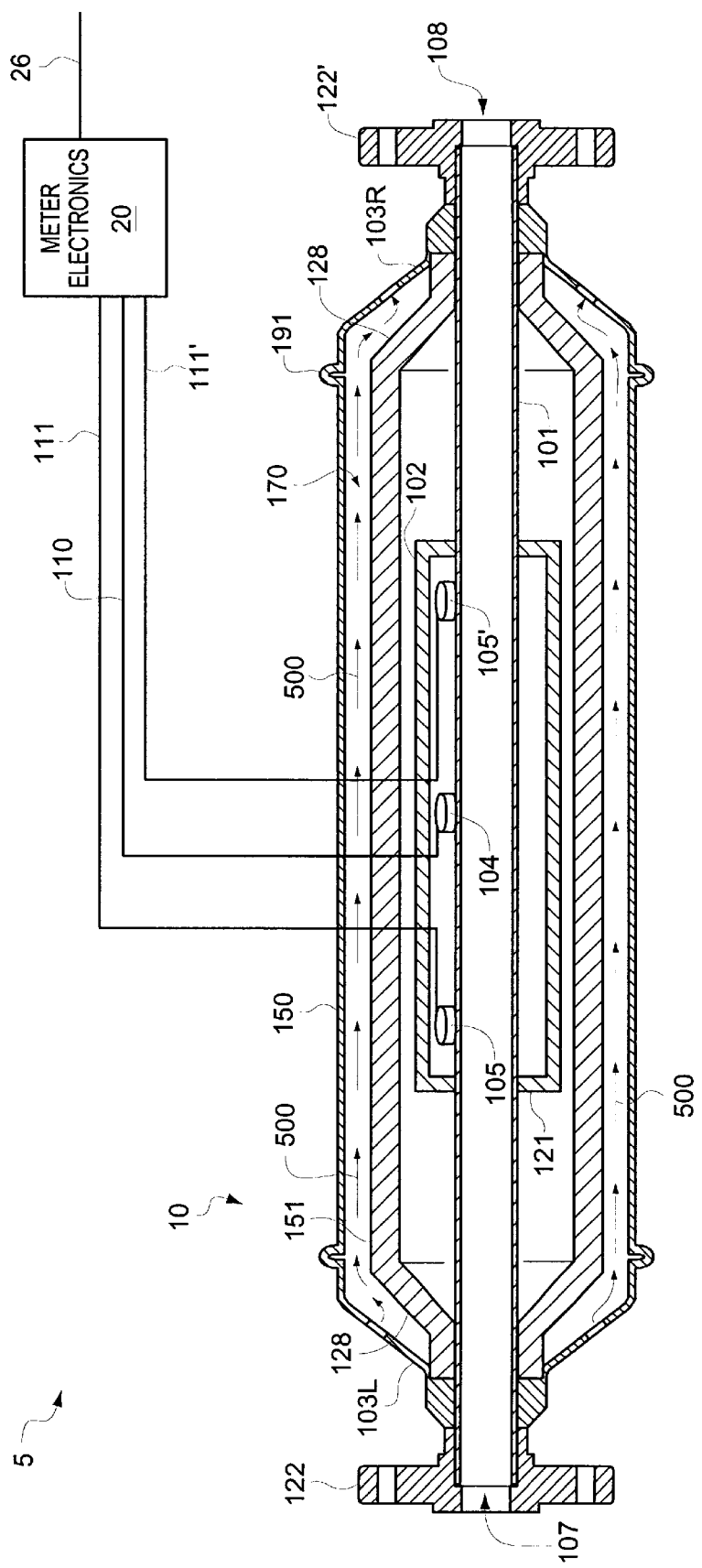
FIG. 5 illustrating a cross sectional view of a Coriolis flowmeter showing fluid flowing in a gap between a casing and a veneer.

Gap 170 may be formed between inner surface of veneer 150 and outer surface 151 of casing 103. The gap 170 allows casing 103 to expand and contract inside veneer 150 without applying any stress to veneer 150. Alternatively or in conjunction with gap 170, veneer 150 may have bellows 191 (Shown on FIGS. 3–5) at opposing ends of casing 150. Bellows 191 are bends in the surface of veneer 150 that can expand and contract so that as the underlying casing 103 expands and contracts bellows 191 bend and unbend to prevent stress on veneer 150.

Figure 3:
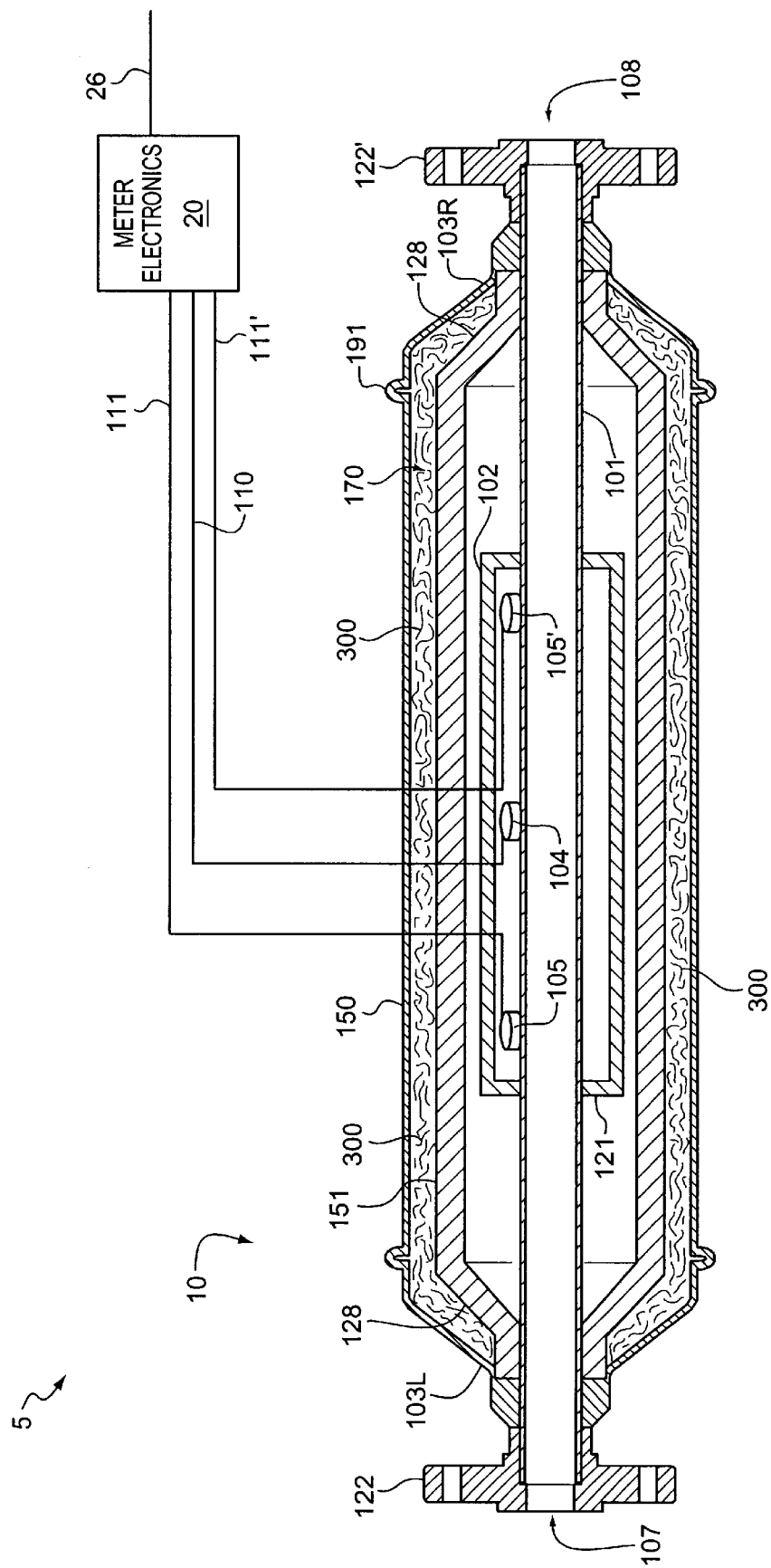
FIG. 3 illustrating a cross sectional view of the Coriolis flowmeter showing insulation in a gap between a casing and a veneer.

In some embodiments, gap 170 may contain insulation 300 as shown in FIG. 3. Insulation 300 keeps the temperature more uniform inside veneer 150. Insulation 300 may be used to retain heat in casing 103. This heat retention reduces axial stress due to temperature gradients inside Coriolis sensor 10. Heating elements 400 (Shown in FIG. 4) may also be mounted inside gap 170. Heating elements 400 provide a heat jacket that heats casing 103 to reduce axial stress in Coriolis sensor 10 caused by expansion and contraction of flow tube 101. In a third alternative, a fluid 500 (Shown by arrows in FIG. 5) may flow through gap 170 to regulate the temperature of Coriolis sensor 10.

The above is a description of a casing having a veneer made of sanitary or non-corrosive material. It is envisioned that those skilled the art can and will design alternative casings for Coriolis flowmeters that infringe on the casing having a veneer as set forth in the claims below either literally or through the Doctrine of Equivalents.

What is claimed is:

1. An apparatus for enclosing a flow tube of a device for measuring properties of a material flowing through said flow tube, said apparatus comprising:
   a casing substantially enclosing said flow tube from an inlet end to an outlet end of said flow tube; and
   a veneer affixed to opposing ends of an outer surface of said casing to enclose said outer surface of said casing to provide a sanitary surface for said casing.

2. The apparatus of claim 1 wherein said veneer expands and contracts at a rate different from said casing.

3. The apparatus of claim 2 further comprising:
   bellows in said veneer that allow said veneer to expand and contract independent of said outer surface of said casing.

4. The apparatus of claim 3 wherein said bellows comprise:
   a bend in said veneer that expands and contracts in response to said casing expanding and contracting.

5. The apparatus of claim 1 further comprising:
   a gap between said outer surface of said casing and said veneer enclosing said outer surface of said casing.

6. The apparatus of claim 5 further comprising:
   insulation filling said gap between said veneer and said outer surface of said casing.

7. The apparatus of claim 5 further comprising:
   heating elements installed in said gap to provide a heating jacket.

8. The apparatus of claim 1 wherein said flow tube is a straight flow tube connected to an inlet flange and an outlet flange, said apparatus further comprising:
   a first end of said casing affixed to said inlet flange;
   a second end of said casing affixed to said outlet flange;
   a first end of said veneer affixed to said first end of said casing proximate said inlet flange wherein said first end of said veneer encloses said first end of said casing; and
   a second end of said veneer affixed to said second end of said casing proximate said outlet flange wherein said second end of said veneer encloses said second end of said casing.

9. The apparatus of claim 8 wherein said casing and said flow tube are made out of materials having substantially equal coefficients of thermal expansion.

10. The apparatus of claim 9 wherein said flow tube is made of titanium.

11. The apparatus of claim 9 wherein said casing is made of carbon steel.

12. The apparatus of claim 9 wherein said veneer is made of a material that has a coefficient of thermal expansion that is significantly different than the coefficient of thermal expansion of the material of said flow tube.

13. The apparatus of claim 12 wherein said veneer is made of stainless steel.

14. A Coriolis flowmeter comprising:
    a flow tube having an inlet end and an outlet end;
    a driver associated with said flow tube for oscillating said flow tube;
    sensors associated with opposing ends of said flow tube to measure a phase difference caused by Coriolis effects as a material flows through said flow tube;
    a casing affixed to said inlet end and said outlet end and substantially enclosing said flow tube from said inlet end to said outlet end; and
    a veneer affixed to opposing ends of an outer surface of said casing to enclose said outer surface of said casing to provide a sanitary surface for said casing.

15. The Coriolis flowmeter of claim 14 further comprising:
    bellows in said veneer that allow said veneer to expand and contract independent of said outer surface of said casing.

16. The Coriolis flowmeter of claim 15 wherein said bellows comprise:
    a bend in said veneer that expands and contracts in response to said casing expanding and contracting.

17. The Coriolis flowmeter of claim 14 further comprising:
    a gap between said outer surface of said casing and said veneer enclosing said outer surface of said casing.

18. The Coriolis flowmeter of claim 17 further comprising:
    insulation filling said gap between said veneer and said outer surface of said casing.

19. The Coriolis flowmeter of claim 17 further comprising:
    heating elements installed in said gap to provide a heating jacket.

20. The Coriolis flowmeter of claim 19 wherein said flow tube is a straight flow tube and said flowmeter further comprises:

an inlet flange affixed to said inlet end of said flow tube;

an outlet flange affixed to said outlet end of said flow tube;

a first end of said casing affixed to said inlet flange;

a second end of said casing affixed to said outlet flange;

a first end of said veneer affixed to said first end of said casing proximate said inlet flange wherein said first end of said veneer encloses said first end of said casing; and a second end of said veneer affixed to said second end of said casing proximate said outlet flange wherein said second end of said veneer encloses said second end of said casing.

21. The Coriolis flowmeter of claim 20 wherein said casing and said flow tube are made out of materials having substantially equal coefficients of thermal expansion.

22. The Coriolis flowmeter of claim 21 wherein said flow tube is made of titanium.

23. The Coriolis flowmeter of claim 21 wherein said casing is made of carbon steel.

24. The Coriolis flowmeter of claim 21 wherein said veneer is made of a material that has a coefficient of thermal expansion that is significantly different than the coefficient of thermal expansion of the material of said flow tube.

25. The Coriolis flowmeter of claim 24 wherein said veneer is made of stainless steel.

* * * * *

UNITED STATES PATENT AND TRADEMARK OFFICE
CERTIFICATE OF CORRECTION

PATENT NO.      : 6,330,832 B1
DATED           : December 18, 2001
INVENTOR(S)     : David F. Normen and Michael Leon Overfelt It is certified that error appears in the above-identified patent and that said Letters Patent is hereby corrected as shown below:

<u>Title page,</u>
Item [75], Inventors, replace "David F. Normen, Louisville; Michael Leon Overfeldt, Longmont, both of CO (US)" with -- David F. Normen, Louisville; Michael Leon Overfelt, Longmont, both of CO (US) --

<u>Column 6,</u>
Line 40 replace "a casing affixed to said inlet end and said outlet end and" with
-- a casing affixed to said inlet end and said outlet end of said flow tube and --

Signed and Sealed this

Twenty-sixth Day of November, 2002

*Attest:*

*Attesting Officer*

JAMES E. ROGAN
*Director of the United States Patent and Trademark Office*